Nov. 21, 1950     G. W. SCHATZMAN     2,530,402
FENDER SHIELD
Filed Aug. 29, 1946     2 Sheets-Sheet 1
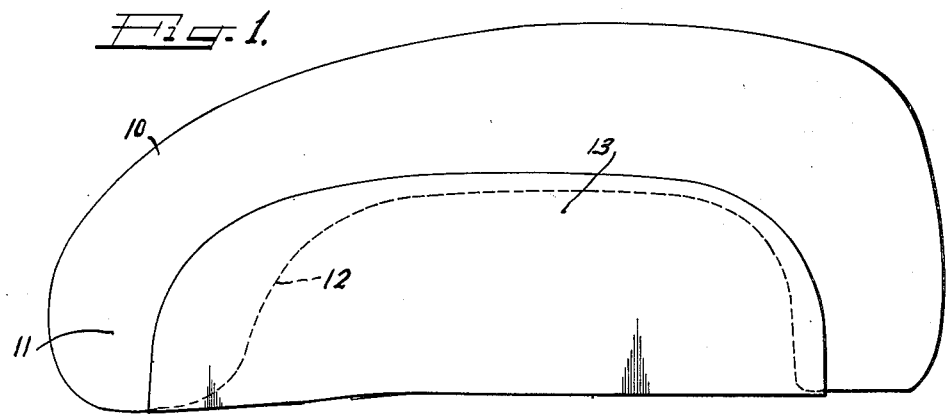
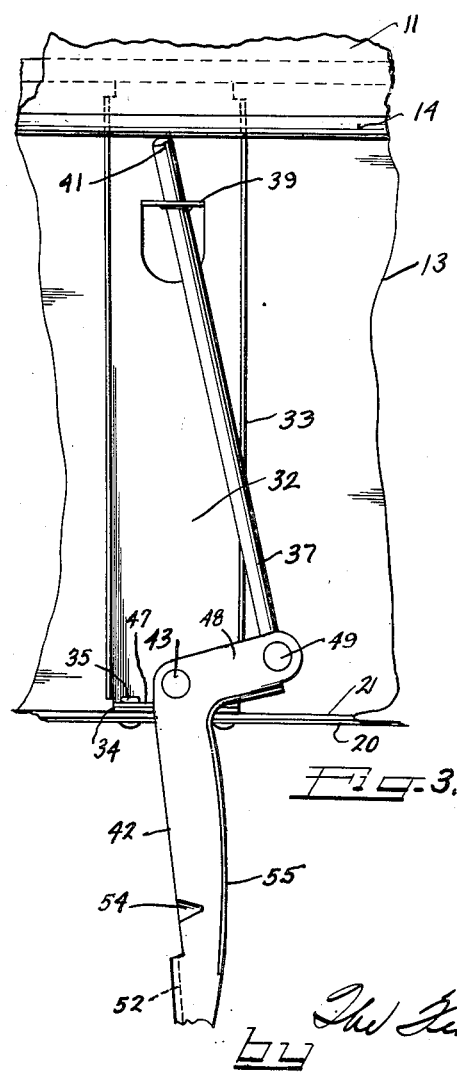
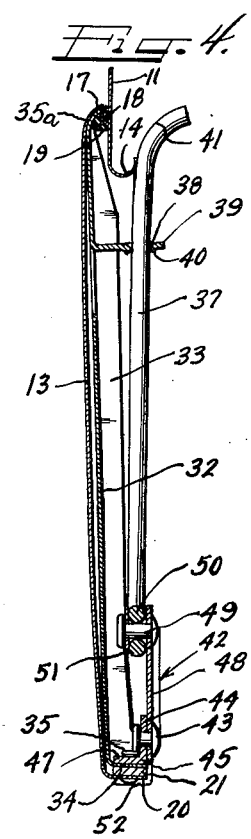
Inventor
George W. Schatzman

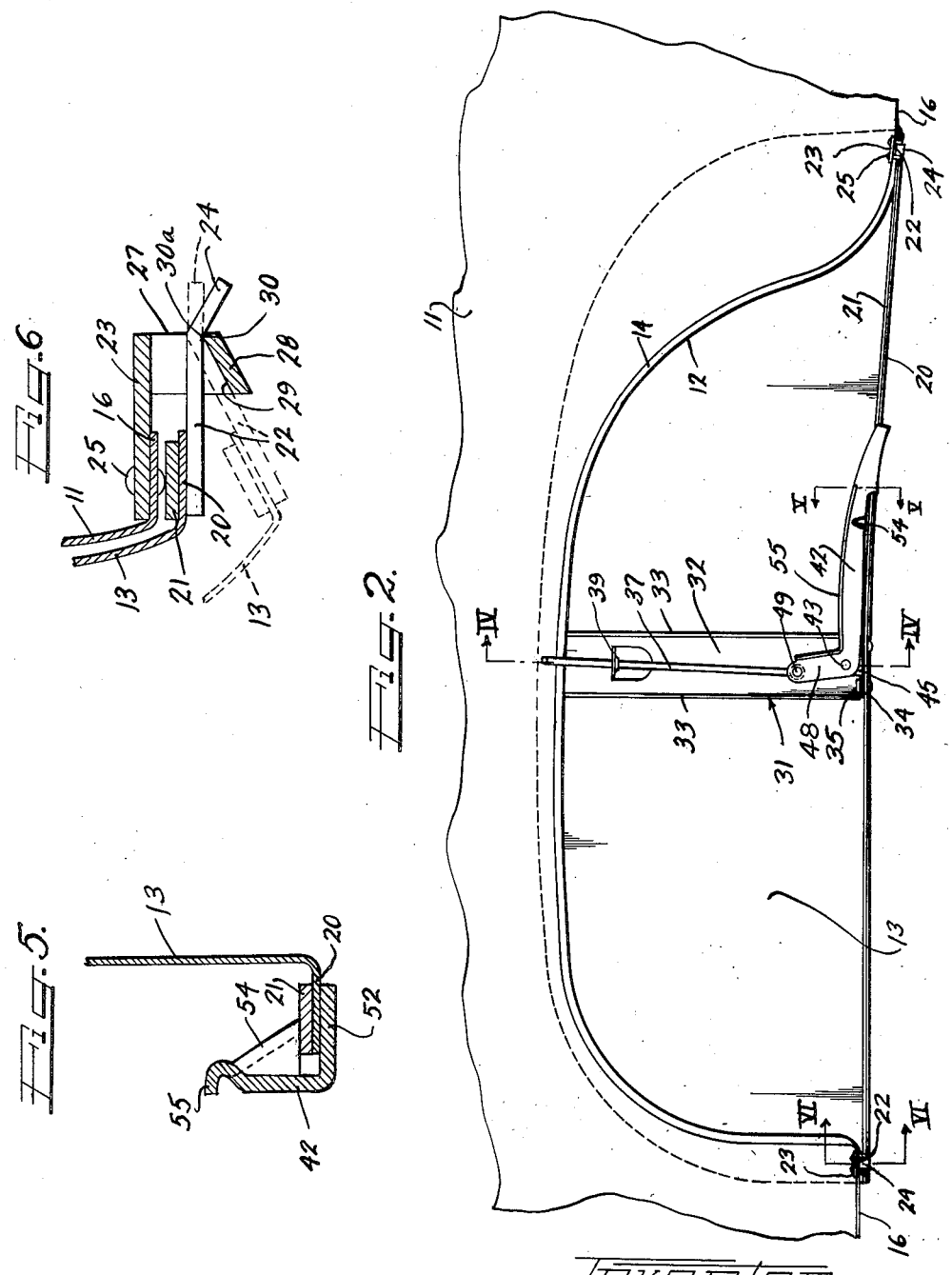

Patented Nov. 21, 1950

2,530,402

UNITED STATES PATENT OFFICE 2,530,402

FENDER SHIELD

George W. Schatzman, Detroit, Mich., assignor to Houdaille-Hershey Corporation, Detroit, Mich., a corporation of Michigan Application August 29, 1946, Serial No. 693,785

12 Claims. (Cl. 280—153)

This invention relates to fender and fender skirt or shield constructions, and more particularly to novel means for mounting and securing fender shields to the fenders, and to novel supporting, clamping and latching mechanisms therefore.

In the vehicle industry, and particularly in the automobile industry, various means have been utilized to improve the appearance of vehicle fenders. The usual vehicle fender is provided with an opening which affords access to the vehicle wheel, and which permits the ready removal or replacement of the wheel in an axial direction. Since this opening inherently presents an unattractive outward appearance, detachable fender shields have been employed to substantially cover the opening.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly away from the principal body portion of the vehicle.

An important object of the present invention is to provide a novel fender and fender shield construction in which the fender shield is secured to the fender in a novel manner.

Another object of the invention is to provide a novel fender shield construction which is economical to manufacture, which is rugged and reliable in use, and in which the fender shield may be readily and quickly attached to and detached from the vehicle fender.

Another object of this invention is to provide a fender shield having novel clamping and latching means thereon.

Still another object of the invention is to provide a novel mechanism for detachably securing a fender shield to a vehicle fender.

Yet another object of the invention is to provide novel means for securing a fender shield detachably to a fender and which is adapted for simple and easy attachment or detachment of the fender shield but is nevertheless positive and reliable in action.

Other objects, features and advantages of the present invention will become readily apparent from the following detailed description of a preferred embodiment thereof taken in conjunction with the accompanying two sheets of drawings in which:

Figure 1 is a side elevational view of a fender and fender shield combination according to the present invention;

Figure 2 is an enlarged fragmentary inside elevational view showing the fender shield and the immediately adjacent portion of the fender;

Figure 3 is an enlarged fragmentary elevational view of the inside of the fender shield showing the clamping and latching structure thereof in open or non-clamping condition;

Figure 4 is a vertical sectional detail view on an enlarged scale taken along the line IV—IV of Figure 2;

Figure 5 is an enlarged sectional detail view taken along substantially the line V—V of Figure 2; and Figure 6 is an enlarged fragmentary sectional detail view taken along substantially the line VI—VI of Figure 2.

In the exemplary form of the invention shown in the drawings, a vehicle fender 10 having a side wall 11 is formed with a wheel opening 12 over which a fender shield 13 is attractively mounted in closing relation.

Defining the wheel opening 12 is a reinforcing and finishing flange 14 curled inwardly in the form of an open bead which at the opposite ends of the opening merges into a flat horizontal inwardly directed reinforcing flange 16 (Fig. 2).

The fender shield 13 is of a size to overlap the fender wall 11 about the opening 12 and may be formed as a single sheet metal panel having its upper and end edges formed with an inwardly curvate reinforcing flange 17 having a depending portion 18 adapted to interengage with a resilient gasket 19 by which rattle-proof contact is effected with the fender wall. Along its lower edge, the fender is formed with a right angular or horizontal, inwardly extending reinforcing flange 20 which is preferably further reinforced by a metal strip 21 of relatively heavier gauge.

Improved means for quickly attaching the fender shield 13 in place on the fender 10 comprises an inwardly extending tongue or finger 22 (Figs. 2 and 6) carried adjacent to each of the opposite ends of the fender and engageable with respective hangers 23 carried by the flange 16 of the fender at appropriate locations adjacent the opposite ends of the wheel opening 12.

Each of the attaching fingers 22 comprises an elongated flat metallic bar having its outer end portion secured in any suitable fashion as by welding or riveting to the base flange 20 of the fender shield and projecting inwardly therebeyond to an appropriate extent to a downwardly oblique angular interengaging or attachment terminal portion 24.

Each of the hangers 23 comprises a metal bar of substantial width and length which is secured to the fender flange 16 as by means of rivets 25 and has depending from its inner margin a hanger loop 27. The loop 27 is formed with an outwardly and downwardly obliquely tilted horizontal hanger bar 28 providing a cam surface 29 to facilitate entry of the associated finger 22 into the hanger loop.

The upper or inner edge of the hanger bar 28 identified at 30 serves to engage in latching interlocking relation as a keeper within the reentrant groove, identified at 30a between the main portion of the attaching finger 22 and the attachment terminal 24 thereof. Thus, in applying the fender shield 13 it is moved inwardly toward the fender and the fingers 22 are guided into the respective hanger loops 27 while the fender shield is tilted outwardly, as indicated in broken outline in Fig. 6, thereby clearing the attachment terminals 24 through the respective loops. Then when the fender shield 13 is tilted up about the pivot provided by the keeper edges 30 into abutting engagement with the fender, the terminals 24 engaging behind the keeper edges 30 of the hanger bars 28 prevent the fender shield from moving outwardly away from the fender adjacent the lower edge thereof.

By preference the dimentional relationship of the keeper edge 30 of the hanger and the interlocking groove 30a is such that the lower portion of the fender shield is held in snug marginal engagement with the fender wall 11 when the upper portion has been swung into full marginal bearing with the fender.

In order to clamp the fender shield 13 in place and hold it against swinging outwardly about the pivots provided by the fingers 22 in the hangers 23, a novel clamping and latching mechanism 31 is preferably mounted in substantially central position on the back of the fender shield for engagement with the upper inner margin of the fender wall 11 at the reinforcing bead 14.

By preference, the clamping and latching mechanism includes a vertical sheet metal bar 32 formed with rearwardly right angular reinforcing flanges 33 at its longitudinal edges. At its lower edge, the bar 32 is formed with a right angular horizontal foot flange 34 which rests upon the reinforcing bar 21 of the fender shield and may be secured thereto as by means of rivets 35. At its upper end, the bar 32 is formed with a terminal flange 35a (Fig. 4) complementary to the inner side of the upper edge reinforcing flange 17 of the fender shield and cooperating at its edge within the reentrant corner formed by the fender shield flange 17 and the downward extension 18 thereof in back of the anti-rattle and cushioning gasket 19. As a result, the bar 32 provides a substantial reinforcement for the central portion of the panel of the fender shield 13.

As best seen in Figures 2 and 4, through the construction just described, the upper end of the bar 32 is disposed at the outer side of the margin of the fender wall 11 in the assembled condition of the fender shield. Hence, a clamping member 37, herein in the form of a generally vertically reciprocable rod carried by the bar 32 is adapted to effect a clamping engagement with the interposed margin of the fender wall 11 where the latter extends between the upper end of the bar 32 and the upper end portion of the clamping member 37.

According to the present invention, the clamping rod member 37 is reciprocably guided in an eye 38 formed as an aperture in an integral horizontal lug 39 struck out from the upper portion of the bar 32. The eye 38 is dimensioned to afford a free relative sliding bearing for the clamping rod 37 and is preferably formed with a downwardly projecting annular flange structure 40 which avoids binding or abrasion from relatively rough edge formation due to punch burrs or the like.

At its upper end, the clamping rod 37 is formed with a cam surface 41 to facilitate clamping engagement thereof with the fender flange 14. Such cam surface may be formed conveniently and economically by simply curvingly inwardly bending the upper end portion of the rod substantially as shown in Fig. 4.

At its lower end, the clamping rod member 37 is connected to actuating means by which it can be manually reciprocated between clamping and non-clamping position. Herein such actuating means comprises a bell crank type of hand lever 42 which is preferably formed as a sheet metal stamping. The lever 42 has its heel portion pivotally secured in a plane with the axis of the rod guiding eye 38, as by means of a rivet headed pin or stud 43, to an upright ear 44 of an angular bracket 45 (Fig. 4). This bracket is formed with a base flange 47 extending right angularly away from the face of the ear 44 to which the lever 42 is pivoted. The base flange 47 is secured to the reinforcing bar 21 and flange assembly, preferably on top of the flange 34, by the rivets 35, and with the outer face of the ear 44 flush with or clear of the edge of the assembled flanges 20 and 34 and the reenforcing bar 21. Thereby the lever 42 is mounted to swing freely in a vertical plane inside of the fender shield.

A short arm 48 of the actuating lever 42 projects generally upwardly and serves in the nature of an actuating link secured adjacent its free end as by means of a rivet headed pin or stud 49 to a lower end parallel, integral loop 50 on the clamping rod 37. A washer 51 (Fig. 4) may be interposed between the side of the loop 50 opposite the lever arm 48 and the adjacent head of the stud 49.

It may be noted that the connecting loop 50 is in a plane normal to the bend of the upper cam terminal 41, whereby the clamping rod 37 is held at all times by the connection with the lever arm 48 nonrotatably in its working relation to the bar 32 and the fender bead 14.

The long arm of the lever 42 serves as an actuating handle and is formed along its lower edge adjacent its free end with a limit flange 52 (Figs. 4 and 5) adapted to engage under the lower fender shield flange 20 to limit upward swinging movement of the lever while permitting free downward swinging thereof.

The construction and arrangement of the actuating lever 42 is such that when it is swung down, as shown in Fig. 3, the short actuating arm 48 thereof draws the clamping rod 37 down into non-clamping relation and clear of the fender bead 14. Thus, the fender shield can be swung pivotally in or out freely in removing or replacing it. Then, when the fender shield has been pushed manually up into the assembled relation to the fender, the lever 42 is swung up manually until the limit flange 52 engages the fender shield flange 20 and this causes the short actuating arm 48 to drive the clamping rod 37 upwardly so that the cam end 41 thereof rides onto the inner edge of the fender bead 14 until the bead is engaged by the rod proper below the cam surface 41 and effects a thorough clamping action on the bead 14 tending to drive it toward the adjacent upper edge of the fender shield 13 or, stated another way, drawing the upper edge of the fender shield snugly into engagement with the fender wall 11.

Since reciprocations of the clamping rod 37 by means of the lever 42 also necessarily involve a certain range of oscillation about the sliding fulcrum provided by the eye 38, the eye is dimensioned to afford a loose bearing and may be slightly elongated in the oscillation plane. The downturned eye flange 40 also implements the oscillation action.

By preference, the common plane through the lever and cam rod pivot axes is obtusely angular to the common plane through the axis of the lever pivot 43 and extending along the top face of the handle limit flange 52, this being accomplished in practice by having the short actuating arm 48 of the actuating lever toed out relative to the long arm of the lever, substantially as shown in Figures 2 and 3. As a result, in the clamping relationship of the mechanism, the clamping rod pivot 49 is over-center relative to the lever pivot 43, thereby effectually locking the clamping rod 37 and the lever 42 against unintentional release. Any downward force on the clamping rod 37 while in clamping operation is therefore effectual to lock the same more securely against release, and the lever 42 must be wilfully swung down to release the clamping rod.

As a further safeguard against accidental unclamping of the rod 37, the long arm of the lever 42 is preferably formed with a catch which may simply and efficiently be in the form of a detent 54 pressed laterally from the lower edge thereof, in the same direction as the limit flange 52, and engaging with the upper face of the reinforcing bar 21 in the full latching position of the lever. The detent 54 is preferably cam surfaced so that it automatically rides past the inner edge of the fender shield flange 20 and the bar 21 by outward flexure of the long lever arm and then snaps into holding position to retain the latter against downward swinging until the arm is manually flexed inwardly to clear the detent 54 from the reinforcing bar 21 so that the lever can be manually swung down.

Reinforcement against damaging flexure of the lever 42, and thereby increasing its resiliency, is afforded by forming the upper edge of the lever with an integral reinforcing flange 55.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a fender shield and fender assembly, means for connecting the fender shield to and supporting it on the fender including a hanger bracket carried by the fender and having a depending loop, and a finger carried by the fender shield and engageable within said loop by an inward movement of the fender shield toward the fender, said loop having a cam surface facing in the direction from which the finger enters the loop to facilitate entry of the finger into the loop.

2. In combination in clamping and latching means for a fender shield, a vertical supporting bar for disposition at the inner side of the fender shield, said bar having an inwardly extending eye lug adjacent the upper end thereof, a reciprocable clamping rod guided slidably in said eye, a pivot bracket mounted adjacent the lower end of the supporting bar, an actuating lever pivoted on said bracket to move on a horizontal axis and pivotally secured on a horizontal axis to the lower end of the clamping rod, the lower end of the rod having an integral eye loop, and a connecting pin member effecting the secured relation of the lever and rod and extending through the eye loop.

3. In combination in clamping and latching structure for a fender shield, a vertical supporting bar having the upper end thereof adapted for engagement with the upper end of the fender shield, a clamping and latching rod reciprocably supported by said bar and having an upper clamping end portion adapted to cooperate with the upper end of the bar for clamping the edge of a fender therebetween, and a bell crank actuating lever mounted at the foot of said bar and having the short arm thereof pivotally secured to the lower end of the latch rod, said arm being angularly disposed in such relation to the long arm of the actuating lever so that in the clamping position of the clamping rod, the pivotal connection with the rod is over center relative to the pivot of the lever to afford an over center lock against unintentional unlatching of the rod.

4. In combination in a clamping and latching mechanism for a fender shield, a supporting member, a reciprocable and oscillatable clamping member carried by the supporting member, and a bell crank actuating lever pivotally connected at its short arm with the clamping member and adapted to be swung pivotally at the lower edge of the fender shield, said actuating lever having an outturned flange and an overlying, spaced, outwardly projecting, downwardly and outwardly tapering cam detent cooperating for engagement therebetween of a base flange on the fender shield for latching the mechanism against unclamping movement.

5. In combination in a clamping and latching mechanism for a fender shield, a supporting member, a reciprocable and oscillatable clamping member, and a bell crank actuating lever pivotally connected at its short arm with the clamping member and adapted to be swung pivotally at the lower edge of the fender shield, said actuating lever having cooperating detent and flange means for engagement with a base flange on the fender shield for latching the mechanism against unclamping movement, said flange means comprising a laterally outwardly directed portion to engage under the fender shield flange and said detent comprising an integral portion of the lever outturned from the plane thereof into operative opposition above said fender shield flange.

6. In a fender shield assembly having a fender shield panel including upper and lower marginal generally inturned flange structures, latching means including an elongated supporting bracket extending vertically and having the upper end thereof in association with the upper flange of the fender shield and having a lower rearwarding extending foot flange superimposed on the lower marginal flange of the fender shield, a clamping rod having an upper cam portion end, a guiding eye structure extending inwardly from said bracket and slidably guiding the rod in inwardly spaced relation to the body of the bracket, a supporting bracket on said foot flange and having an upstanding ear disposed with its inner face parallel to and in a plane approximately flush with the inner edge of the lower fender flange, an actuating lever pivotally supported by said ear at the inner face thereof and movable about such pivot inwardly of the lower fender shield flange, and a pivotal connection between said lever and the lower end of the rod whereby to effect vertically reciprocable movements of the rod into and out of latching relation to the flange of a fender interposed between the upper flange of the fender shield and said cam head on the rod.

7. In combination in a fender shield assembly including a fender shield panel, latching mechanism mounted on the inner side of the panel and including a supporting and guide structure, a reciprocable rod supported and guided by said structure for engaging in clamping relation a portion of a fender between the rod and a portion of the fender shield, the rod having a cam end for this purpose, an integral loop at the opposite end of the rod, and an actuating lever having a pivotal connection with said loop and operable to shift said rod longitudinally.

8. In combination in a clamping and latching structure for a fender shield, an elongated supporting strut arranged to be mounted at the inner face of a fender shield panel and having a foot flange adapted to be superimposed upon a lower inturned flange on the fender shield, a vertically reciprocable clamping member supported by said strut, means comprising a flat ear extending upwardly at the inner end of said foot flange, a flat bell crank lever having the heel portion thereof pivotally connected to said ear and swingable in a plane inwardly of said foot flange, the short leg of the bell crank lever being pivotally connected to said reciprocable member.

9. In combination in a clamping and latching structure for a fender shield, an elongated supporting strut arranged to be mounted at the inner face of a fender shield panel and having a foot flange adapted to be superimposed upon a lower inturned flange on the fender shield, a vertically reciprocable clamping member supported by said strut, means comprising a flat ear extending upwardly at the inner end of said foot flange, a flat bell crank lever having the heel portion thereof pivotally connected to said ear and swingable in a plane inwardly of said foot flange, the short leg of the bell crank lever being pivotally connected to said reciprocable member, said lever having a reinforcing flange formed along the reentrant corner edge thereof projecting inwardly and extending throughout the major portion of the edges of the short and long legs of the lever, an outturned flange at the free extremity of the long leg of the lever and disposed on the lower edge of such leg, and a detent comprising an outwardly deflected portion of the lower edge of the lever adjacent to said lower edge flange and having the lower end thereof in spaced relation to the upper side of said lower edge flange whereby to permit engagement of the fender shield lower marginal flange therebetween.

10. In a fender shield latch structure, an elongated sheet metal lever adapted to be pivotally mounted at one end portion thereof to the lower portion of a fender shield for pivotal manipulation to swing down below and behind a rearwardly extending lower flange on the fender shield in the actuation of a latch structure by the lever, the opposite end portion of the lever having limit means thereon engageable with opposite sides of the fender shield flange for holding the lever in the position wherein the latch structure is in latching condition, said limit means comprising a projection from the lever engageable with one side of the flange and another projection in the form of an integral generally triangular, tapering detent pressed out of the plane of the lever and having the base of the triangular formation in operative spaced relation to said first mentioned projection to engage with the opposite side of the flange.

11. In combination in a fender and fender shield assembly, a fender having an inwardly extending horizontal flange, a fender shield cooperative in assembly with the fender and also having an inwardly extending flange disposed in the assembly at a lower elevation than the fender flange, a bracket structure mounted on said fender flange and having a hanger bar disposed rearwardly from the fender flange and at a lower elevation than the fender shield flange, and an engagement finger carried by the fender shield flange and having inwardly and downwardly projecting portions engaging over and inwardly of the hanger bar and thereby connecting the fender shield to said bracket.

12. In combination in a fender and fender shield assembly, a fender having a wheel access opening with the lower margin of the fender at at least one side of the wheel access opening including an inwardly extending flange, a bracket member having a body portion attached to said flange and extending inwardly from the flange, said body having at its inner extremity a U-shape portion extending downwardly and providing an opening accessible from the front of the fender, and a fender shield cooperable with the fender to close said access opening and having a bracket member on the lower margin thereof including a finger portion engaging with said fender bracket within said opening to support the fender shield on the fender.

GEORGE W. SCHATZMAN.

REFERENCES CITED

The following references are of record in the file of this patent:

UNITED STATES PATENTS

| Number | Name | Date |
|---|---|---|
| 2,010,350 | Davis | Aug. 6, 1935 |
| 2,202,904 | Fergueson | June 4, 1940 |
| 2,241,043 | Schatzman | May 6, 1941 |
| 2,267,421 | Purdy | Dec. 23, 1941 |
| 2,302,415 | Buchanan | Nov. 17, 1942 |
| 2,312,536 | Fergueson | Mar. 2, 1943 |
| 2,334,867 | Fergueson | Nov. 23, 1943 |
| 2,352,421 | Wohlfield | June 27, 1944 |